(12) United States Patent
Binder et al.

(10) Patent No.: US 11,981,281 B2
(45) Date of Patent: May 14, 2024

(54) VEHICLE SEAT GROUP AND VEHICLE HAVING A VEHICLE SEAT GROUP

(71) Applicant: ZF AUTOMOTIVE GERMANY GMBH, Alfdorf (DE)

(72) Inventors: Loreen-Marie Binder, Althütte (DE); Sina Chlod, Schwäbisch Gmünd (DE); Lisa Wagner, Schwäbisch Gmünd (DE)

(73) Assignee: ZF AUTOMOTIVE GERMANY GMBH, Aldorf (DE)

( * ) Notice: Subject to any disclaimer, the term of this patent is extended or adjusted under 35 U.S.C. 154(b) by 0 days.

(21) Appl. No.: 17/626,131

(22) PCT Filed: Jul. 7, 2020

(86) PCT No.: PCT/EP2020/069084
§ 371 (c)(1),
(2) Date: Jan. 11, 2022

(87) PCT Pub. No.: WO2021/005038
PCT Pub. Date: Jan. 14, 2021

(65) Prior Publication Data
US 2022/0242353 A1 Aug. 4, 2022

(30) Foreign Application Priority Data
Jul. 11, 2019 (DE) .......................... 102019118846.6

(51) Int. Cl.
*B60R 21/20* (2011.01)
*B60N 2/01* (2006.01)
(Continued)

(52) U.S. Cl.
CPC .............. *B60R 21/20* (2013.01); *B60N 3/001* (2013.01); *B60N 2/01* (2013.01); *B60N 2/14* (2013.01)

(58) Field of Classification Search
CPC ..................................................... B60R 21/20
See application file for complete search history.

(56) References Cited

U.S. PATENT DOCUMENTS 5,947,416 A * 9/1999 Kraft ...................... B64D 11/00
108/42
7,114,755 B1 * 10/2006 Sturt ...................... B60N 3/102
296/24.34

(Continued)

FOREIGN PATENT DOCUMENTS

| DE | 102016102897 A1 | 9/2016 |
| DE | 102017105168 A1 | 9/2017 |

(Continued)

OTHER PUBLICATIONS

PCT International Search Report for corresponding International Serial No. PCT/EP2020/069084, dated Aug. 26, 2020, pp. 1-4.

*Primary Examiner* — Paul N Dickson
*Assistant Examiner* — Shams Dhanani
(74) *Attorney, Agent, or Firm* — TAROLLI, SUNDHEIM, COVELL & TUMMINO L.L.P.

(57) ABSTRACT

The invention relates a vehicle seat group (10) for a vehicle (100) having at least two vehicle seats (12, 14, 16, 18), a table (22) and a vehicle occupant restraint system (20) having at least one restraint element, wherein at least two vehicle seats (12, 14, 16, 18) of the vehicle seat group (10) can be aligned toward each other in their seat length direction (S), wherein the table (22) is arranged between the vehicle seats (12, 14, 16, 18), in particular at a center console (30), wherein at least one restraint element of the vehicle occupant restraint system (20) is disposed in and/or at the table (22). In addition, the invention relates to a vehicle comprising such vehicle seat group.

10 Claims, 11 Drawing Sheets

(51) Int. Cl.
 *B60N 2/14* (2006.01)
 *B60N 3/00* (2006.01)

(56) References Cited

U.S. PATENT DOCUMENTS

| | | | |
|---|---|---|---|
| 7,520,552 B2* | 4/2009 | Nakamura | B60R 7/04 |
| | | | 108/44 |
| 10,059,296 B2* | 8/2018 | Farooq et al. | B60R 21/2165 |
| 11,760,248 B2* | 9/2023 | Adams | B60N 3/001 |
| | | | 296/24.33 |
| 11,760,300 B1* | 9/2023 | Jaradi | B60R 21/2338 |
| | | | 280/743.2 |
| 2023/0278709 A1* | 9/2023 | Wyatt | B64C 27/52 |
| | | | 244/17.25 |
| 2023/0294582 A1* | 9/2023 | Line | B60N 2/143 |
| | | | 108/44 |

FOREIGN PATENT DOCUMENTS

| | | |
|---|---|---|
| DE | 102017128097 A1 | 5/2019 |
| DE | 102018215199 A1 | 3/2020 |
| EP | 1449709 A1 | 8/2004 |
| EP | 102018002853 A1 | 10/2018 |
| FR | 3075127 A1 | 6/2019 |

\* cited by examiner

VEHICLE SEAT GROUP AND VEHICLE HAVING A VEHICLE SEAT GROUP

RELATED APPLICATIONS

This application is a U.S. National Stage Application filed under 35 USC 371, claiming priority to Serial No. PCT/EP2020/069084, filed on 7 Jul. 2020; which claims priority from German Patent Application DE 10 2019 118 846.6, filed 11 Jul. 2019, the entireties of which are hereby incorporated herein by reference.

TECHNICAL FIELD

The invention relates to a vehicle seat group comprising at least two vehicle seats and to a vehicle comprising at least one vehicle seat group of this type.

BACKGROUND

In the course of the discussion of automated and/or autonomous driving, it has been increasingly desired that the occupants in the vehicle can adopt a more flexible position. In particular, the occupants shall be enabled to arrange the vehicle seats in a vehicle seat group such that the viewing direction of the occupants is directed toward each other. Of course, the occupants must be protected properly in a situation of restraint in all positions and, thus, also in the afore-described vehicle seat arrangement.

SUMMARY

It is the object of the invention to provide sufficient vehicle occupant protection in a vehicle particularly in vehicle seats facing each other.

This object is achieved by a vehicle seat group comprising the features of claim 1.

A vehicle seat group according to the invention for a vehicle comprises at least two vehicle seats. At least two vehicle seats of the vehicle seat group can be or are aligned toward each other in their seat length direction. Further, the vehicle seat group according to the invention comprises a center console and a table disposed between the vehicle seats, in particular at the center console, and a vehicle occupant restraint system including at least one restraint element. In the vehicle seat group according to the invention, at least one restraint element of the vehicle occupant restraint system is disposed in and/or at the table that is located between the vehicle seats. Alternatively, or additionally, there may also be provided at least one restraint element of the vehicle occupant restraint system being disposed in and/or at the center console.

The seat length direction is defined as the direction in which the seating surface and the backrest surface are arranged one behind the other.

The restraint element disposed in and/or at the table in a preferred embodiment is an airbag module. Preferably, plural airbag modules or one airbag module having plural airbags is/are arranged in and/or at the table. Further restraint elements, particularly airbag modules, can moreover be disposed in the center console.

In preferred embodiments, the airbag modules disposed in and/or at the table are preferably configured as front airbag modules and/or as side airbag modules and/or as center airbag module.

In addition, further restraint elements can be disposed in and/or at the vehicle seats. In particular, the restraint elements disposed in and/or at the vehicle seat can comprise a seatbelt system and/or further airbag modules.

In one embodiment, the vehicle seat group comprises four vehicle seats, the vehicle seats being preferably configured to be rotatable about a vertical axis. In addition, the vehicle seats are preferably adjustable, particularly movable, at least along a vehicle length axis. In one embodiment, the vehicle seats can also be adjustable, particularly movable, along a vehicle transverse direction. In a vehicle seat group of this type, the table and the center console are preferably arranged in an area between two front vehicle seats and two rear vehicle seats.

The table is arranged to be preferably pivotable or rotatable at the center console so that the alignment and the position of the table can be adapted to a positioning of the vehicle seats of the vehicle seat group. Moreover, the table can be provided to be accommodated and/or stowed in the center console. For example, the table can be accommodated in the center console, if the vehicle seats are arranged in a normal position and the seat length direction of all vehicle seats of the vehicle seat group coincides with the vehicle length direction and, thus, with a normal driving direction of the vehicle and the vehicle occupant restraint can be adopted, in a situation of restraint, by restraint elements disposed in the instrument panel, for example.

Furthermore, the table may comprise plural table board members. In this way, different table configurations are possible, for example, depending on the arrangement of the vehicle seats relative to each other. Preferably, the airbag modules in such embodiment are disposed in the table board members such that they can be used in various table configurations for restraining the vehicle occupants.

It can moreover be provided that, depending on the positioning of the vehicle seats of the vehicle seat group relative to each other, and/or depending on the table configuration, only particular restraint elements of the vehicle occupant restraint system of the vehicle seat group are activated in each situation of restraint. In particular, with plural airbags disposed in the table, in different airbag configurations there are provided different airbags to be taken into account which are activated in different restraint situations and in different arrangements of the respective vehicle seats.

The object is further achieved by a vehicle comprising the features according to the claims that comprises an afore-described vehicle seat group according to the invention.

In one embodiment, the table and, if provided, the center console is/are arranged in an area between two front and two rear vehicle seats of the vehicle.

In such embodiment, the center console can extend over the entire length of the vehicle seat group in the vehicle length direction.

As an alternative, the center console may only extend over a partial area of the length of the vehicle seat group. For example, in this way the vehicle seats can be enabled to be arranged in such a way that a respective vehicle seat is positioned in front of, behind, on the right and on the left of the center console.

In one embodiment, in the vehicle at least partially different airbag modules and/or different airbags are activated by a control unit depending on the arrangement of the vehicle seats of the vehicle seat group inside the vehicle.

The table and/or the center console can moreover be used for further improvements of the occupant comfort. For example, in the center console, the table board members may be disposed so that they can also be used for one or several of the vehicle seats in the normal position.

In a possible variant, the table is provided with a fold-out monitor. If necessary, terminals for electronic devices as well as stowage compartments may be provided in the center console. In this way, the number of the loose objects in the vehicle interior can be reduced, and the monitor integrated in the table may be used as an external monitor for any electronic devices of the respective occupants.

It is also possible to provide an extendable partition in the center console which can be interposed between adjacent vehicle seats so as to create more privacy for each occupant. The partition may be rigid or flexible, but, in any case, it should be made of a light-weight material.

The vehicle seat group according to the invention is suited to be employed in autonomously driving vehicles for individual traffic, wherein one or two vehicle seat groups are juxtaposed in the vehicle interior, for example.

Of course, it is also possible to place further vehicle seat groups in the vehicle interior, such as in a coach, a train, a people mover or a ship. In particular in such case, the vehicle can also be steered by a human driver, of course, wherein the vehicle seat groups according to the invention are only provided for the passengers.

It is likewise possible to provide further conventional vehicle seats in addition to one or more vehicle seat groups according to the invention.

BRIEF DESCRIPTION OF THE DRAWINGS

Further advantages, features and details of the invention will result from the following description of embodiments that are not meant to be limiting as well as by means of the drawings, wherein.

DESCRIPTION

Figure 1:
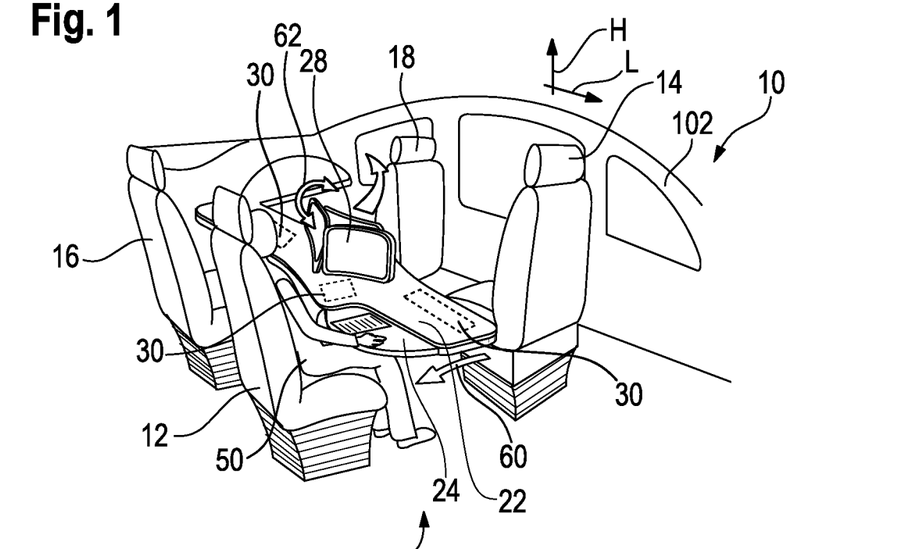
FIG. 1 shows a perspective view of an embodiment of a vehicle seat group according to the invention in a vehicle.

FIG. 1 shows a vehicle 100 comprising a vehicle seat group 10 according to the invention. The vehicle seat group 10 shown here comprises four vehicle seats 12, 14, 16 and 18. The vehicle seats 12, 14, 16 and 18 are configured to be rotatable about a vertical axis H and, thus, can be aligned toward each other in their seat length direction S (see FIG. 2).

In addition, the vehicle seat group 10 comprises a table 22 which in this case is arranged in parallel to a vehicle length direction L and is designed to be so wide that several vehicle occupants 50 can work there next to each other, for example. The dimensions of the table 22 can be freely adapted, however, at the skilled person's discretion, of course.

In the table 22, moreover restraint elements of the vehicle occupant restraint system 20 of the vehicle seat group 10 are arranged which are configured as airbag modules 30 in this case.

In addition, in the shown embodiment, plural monitors 28 which can be coupled to electronic devices of the vehicle occupants 50 and/or are configured as entertainment system for increased comfort, for example, are arranged in the table 22. Electronic devices the data of which are to be shown on the screen 28 can be stowed in appropriate stowage compartments in the center console 26, for example, and can be connected to the monitors 28 via matching terminals disposed there.

Figure 9A:
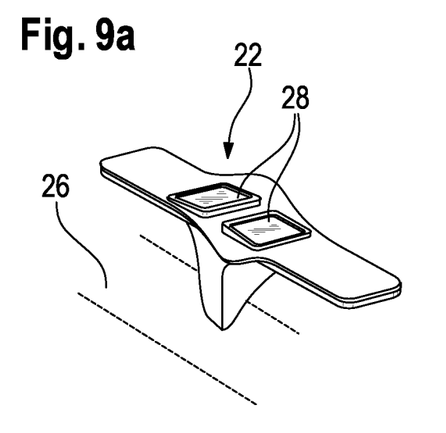
FIGS. 9 to 12 show different variants of a table disposed in or at the center console.
Figure 9B:
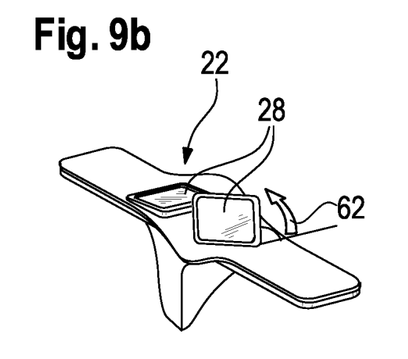
Figure 9C:
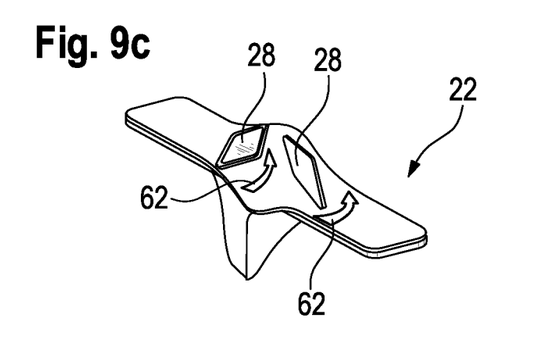

The monitors 28 can be flatly folded into the table board of the table 22, when they are not in use, and for use can be folded out of the surface of the table board (see arrow 62). The monitors 28 are anchored to the table 22 such that they do not detach therefrom in a situation of restraint. Possible different positions of the monitors 28 are illustrated in FIGS. 9a to 9c.

Figure 2:
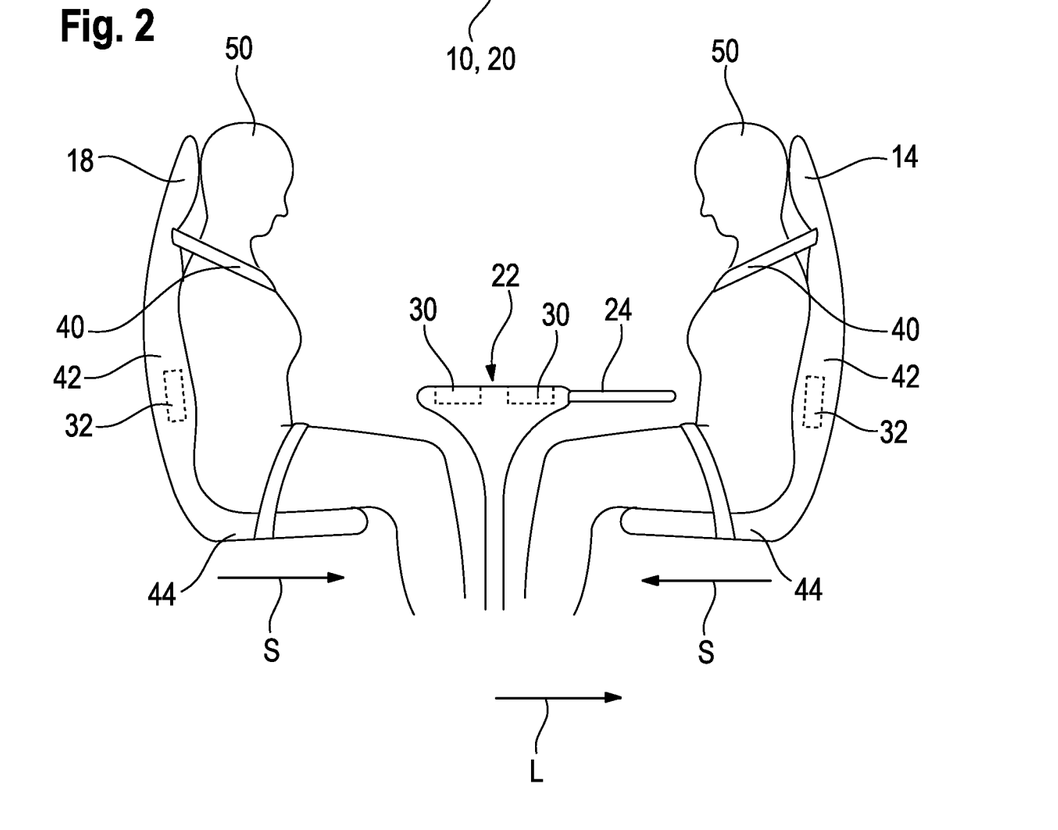
FIG. 2 shows a schematic lateral view of a further embodiment of a vehicle seat group according to the invention.
Figure 3:
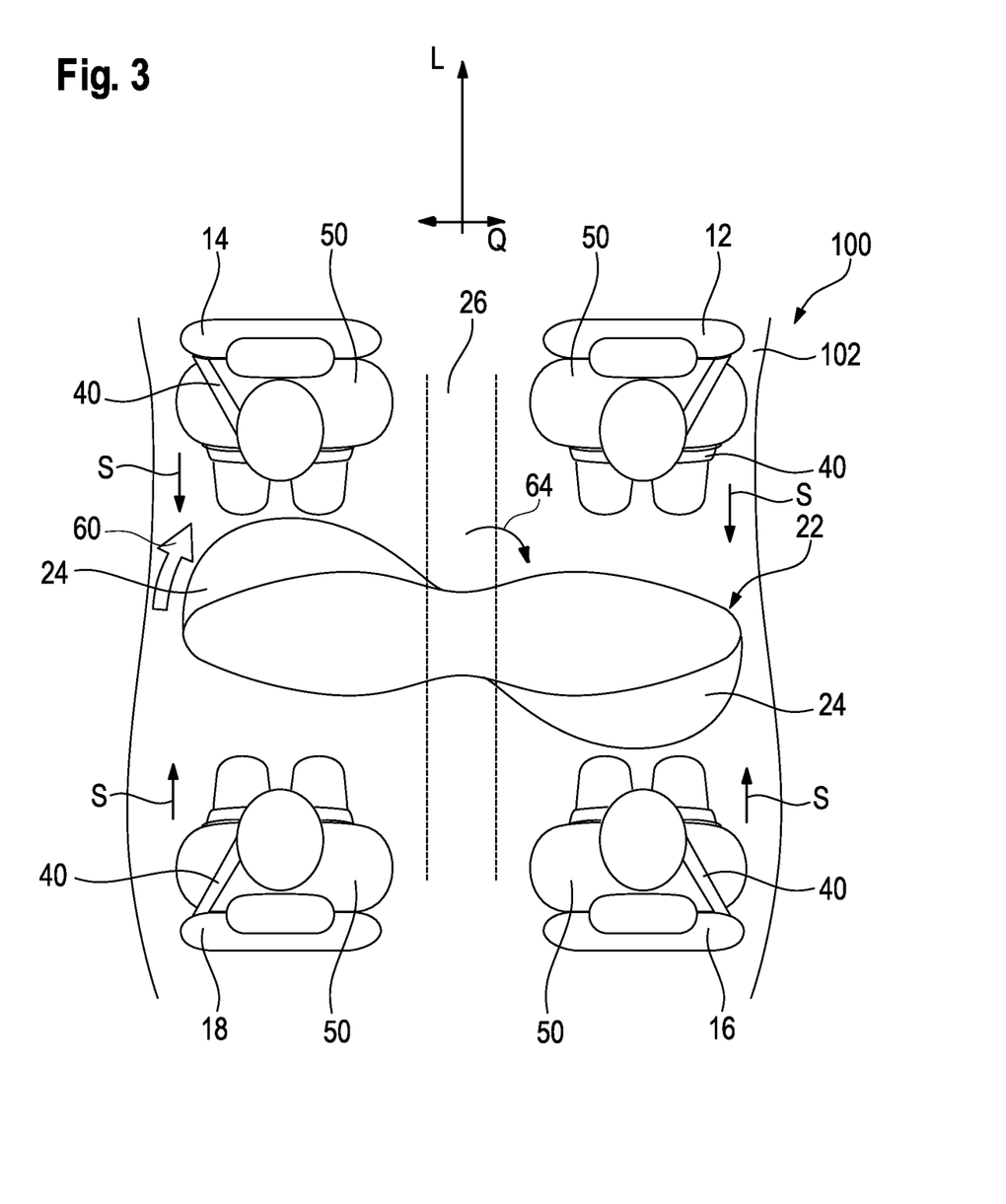
FIG. 3 shows a schematic top view onto the vehicle seat group according to FIG. 2.

FIGS. 2 and 3 also show a vehicle seat group 10, the table 22 being disposed in parallel to the vehicle transverse direction Q in this case. As is evident from FIG. 3 by the arrow 64, the table 22 is arranged at the center console 26 to be pivotable/rotatable. Thus, the positioning of the table 22 can be adapted to the positioning of the vehicle seats 12, 14, 16 and 18 of the vehicle seat group 10. In the embodiment shown here, the front vehicle seats 12 and 14 and the rear vehicle seats 16 and 18 are aligned toward each other in their seat length direction S.

Moreover, it is evident from FIGS. 1 to 6 that the table 22 comprises table board members 24. The table board members 24, on the one hand, can help increase the table surface available to the vehicle occupants 50, for example, by pulling the table board member 24 out of the table 22, as illustrated by the arrow 60. In addition, the table board members 24 may be provided to adapt the table configuration of the table 22 to different positionings of the vehicle seats 12, 14, 16 and 18. Furthermore restraint elements, in particular airbag modules 30, may be provided to be also arranged in the table board members 24.

FIG. 2 moreover illustrates, using the example of the vehicle seats 14 and 18, that the vehicle seat group 10 can comprise further restraint elements disposed in the vehicle seats 12, 14, 16 and 18 in addition to the airbag modules 30 disposed in the table 22. The further restraint elements are configured, in the shown embodiment, as seat-integrated seatbelt systems 40 and as airbag modules 32 arranged in the backrest 42 of the vehicle seats 12, 14, 16 and 18.

Figure 4:
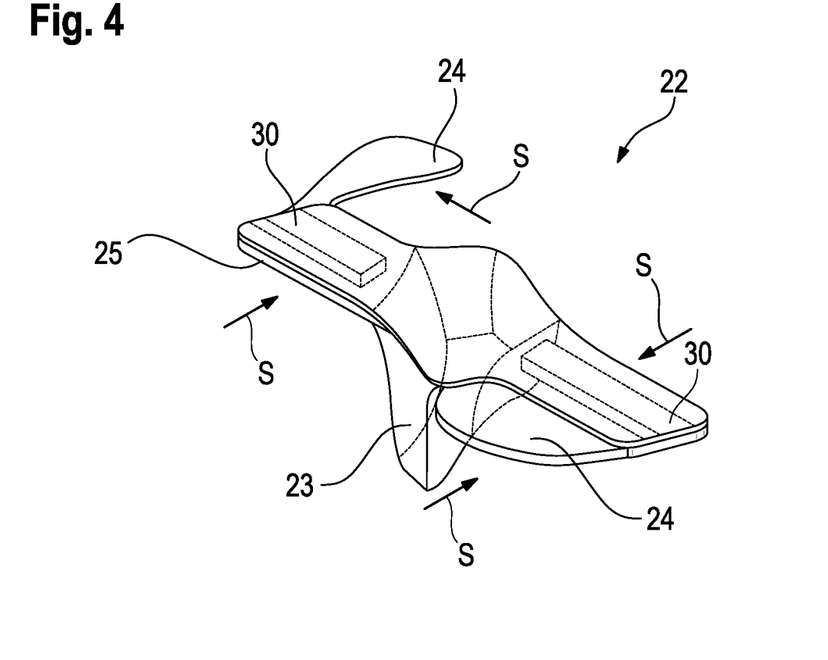
FIG. 4 shows an embodiment of a table of a vehicle seat group according to the invention.
Figure 5:
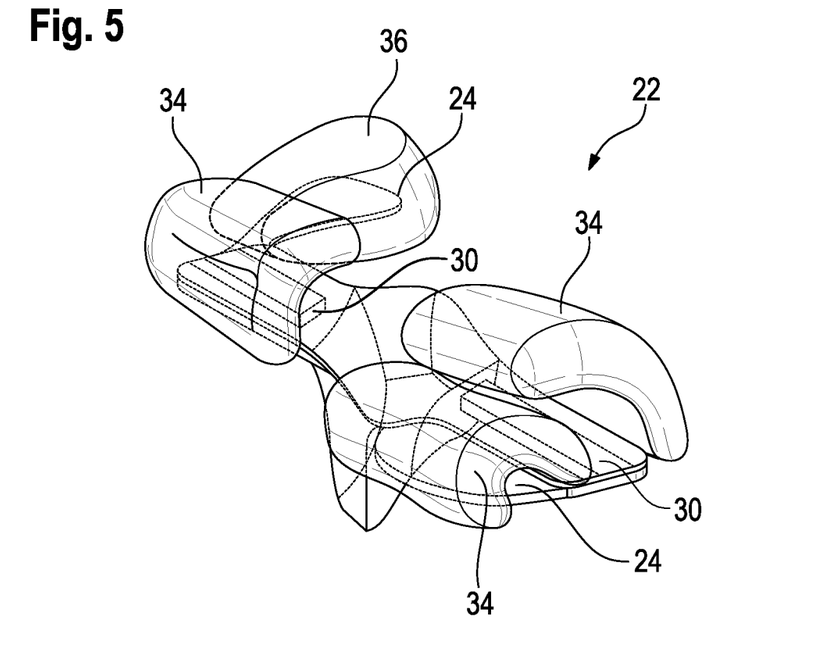
FIG. 5 shows the table according to FIG. 4 with activated airbag modules.

FIGS. 4 and 5 show a table 22 disposed at the center console 26 and having table board members 24 at different exemplary positions, the table 22 being shown with activated airbag modules 30 in FIG. 5. The table 22 can be fastened especially to the center console 26 of the vehicle seat group 10 of the vehicle 100 via a connecting element 23.

FIG. 4 illustrates the table 22 having two table board members 24 folded out in different positions as well as a folded-in table board member 25. A possible alignment of the vehicle seats 12, 14, 16 and 18 (which are not shown in FIG. 4) in this table configuration is shown by the arrows corresponding to the seat length directions S of the vehicle seats 12, 14, 16 and 18. In addition, there are shown possible positions of the airbag modules 30 in or at the table 22.

FIG. 5 shows the table 22 in a situation of restraint with activated airbag modules 30 and filled airbags 34. Depending on the arrangement of the vehicle seats 12, 14, 16, 18 of the vehicle seat group 10, different airbag modules 30 and/or different airbags 34, 36 may be provided to be activated. Furthermore, the airbags may be provided to be configured as adaptive airbags 36 that can adopt different volumes and/or contours.

Figure 6:
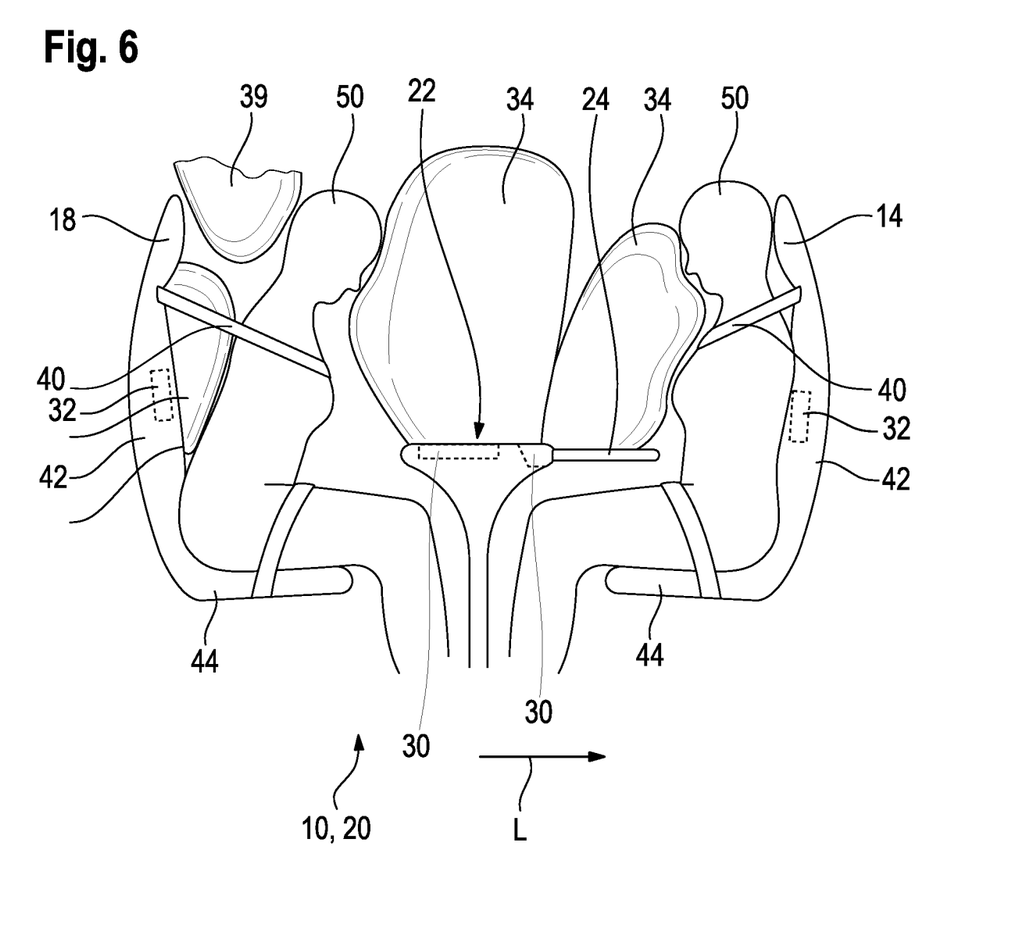
FIGS. 6 to 8 show schematic views of embodiments according to the invention of the vehicle seat group in a situation of restraint.
Figure 7:
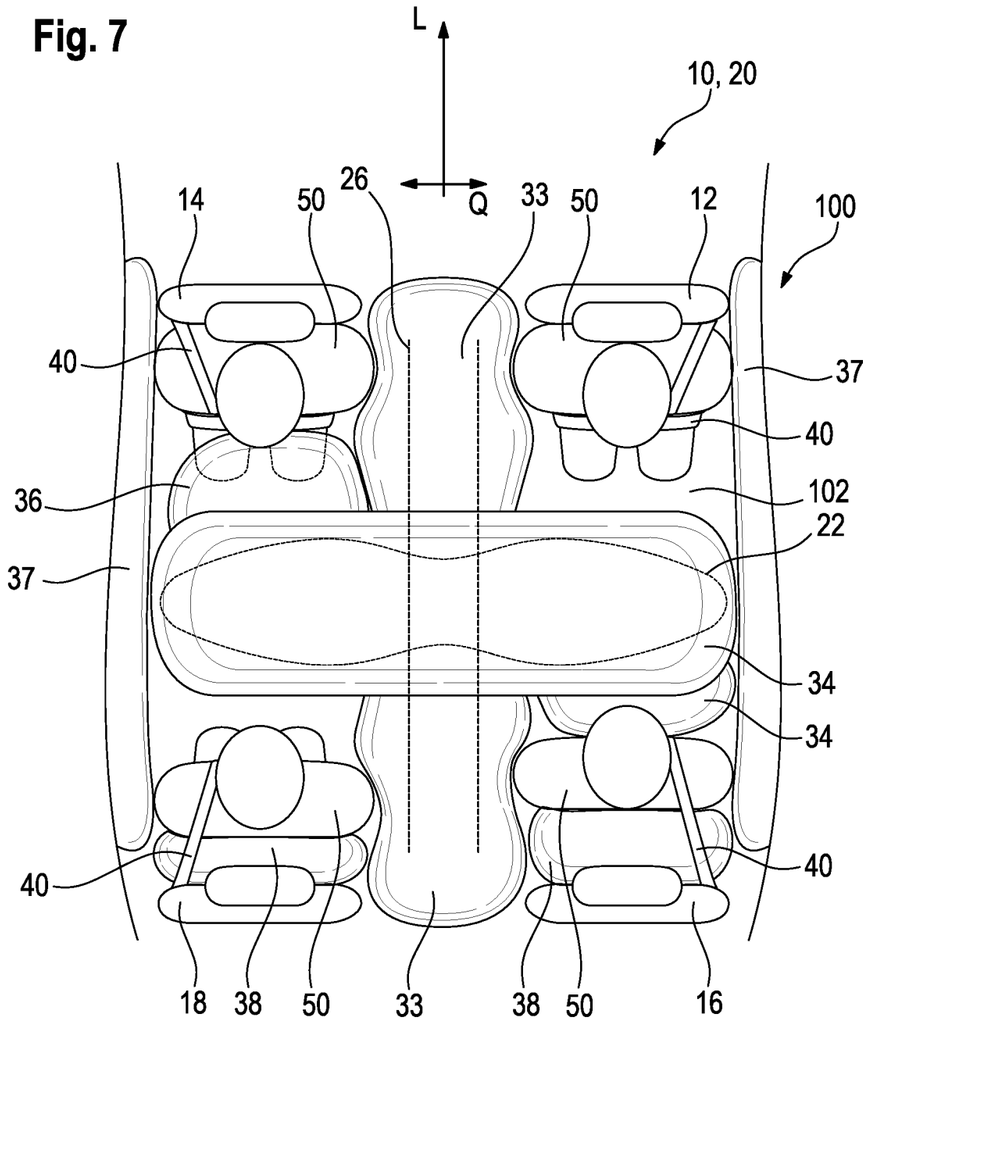

In FIGS. 6 to 7, the vehicle seat group 10 of FIGS. 2 and 3 is illustrated with vehicle occupants 50 being seated opposite to each other in a situation of restraint with activated airbag modules 30, 32 and filled airbags 34 to 39.

Apart from the airbags 34 disposed in the table 22, the vehicle occupant restraint system 20 shown here comprises airbag modules including airbags 33 disposed in the center console 26. What is not shown in FIG. 6 is a knee airbag 35 (see FIG. 15) that can deploy between the lower extremities of vehicle occupants being seated opposite to each other and an element of the vehicle seat group 10 or the vehicle 100, such as the center console 26.

In addition, the vehicle 100 comprises head side airbags/curtain airbags 37, wherein the curtain airbag modules are arranged, in the mounted state, in the area of the roof liner at the roof edge of the vehicle 100. In FIGS. 6 and, resp., 7, moreover additional restraint elements are illustrated in the form of airbag modules comprising airbags 38 and 39. Said airbag modules may be arranged in the vehicle seats 12, 14, 16 and 18 or, for example, in the roof beneath the roof liner of the vehicle 100. The airbags 38, 39 can restrain and protect the vehicle occupant 50 during rebound, for example, and for this purpose can also be activated time-shifted relative to the further restraint elements, for example.

Figure 8:
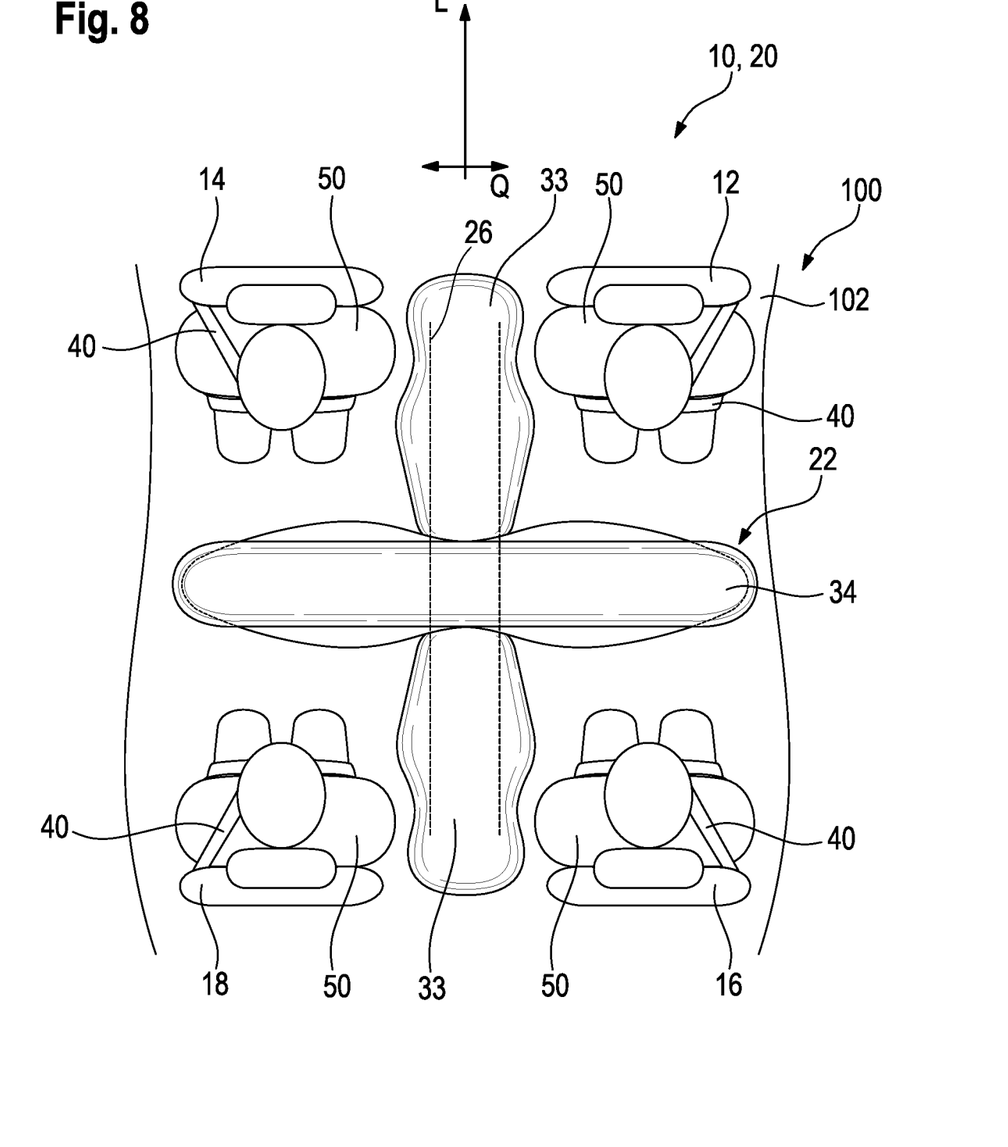

In FIG. 8, a vehicle seat group 10 is also shown in a vehicle 100 in a situation of restraint. In this embodiment, only the airbag modules 30 comprising the airbags 33, 34 disposed in the table 22 and in the center console 26 have been activated for restraint of the vehicle occupants 50. This is intended to illustrate once again that, in a vehicle seat group 10 according to the invention, different airbag modules 30, 32 and/or different airbags 34 to 39 can be activated depending on the arrangement of the vehicle seats 12, 14, 16, 18 of the vehicle seat group 10 and/or the severity of the crash event that has triggered the situation of restraint.

Figure 10:
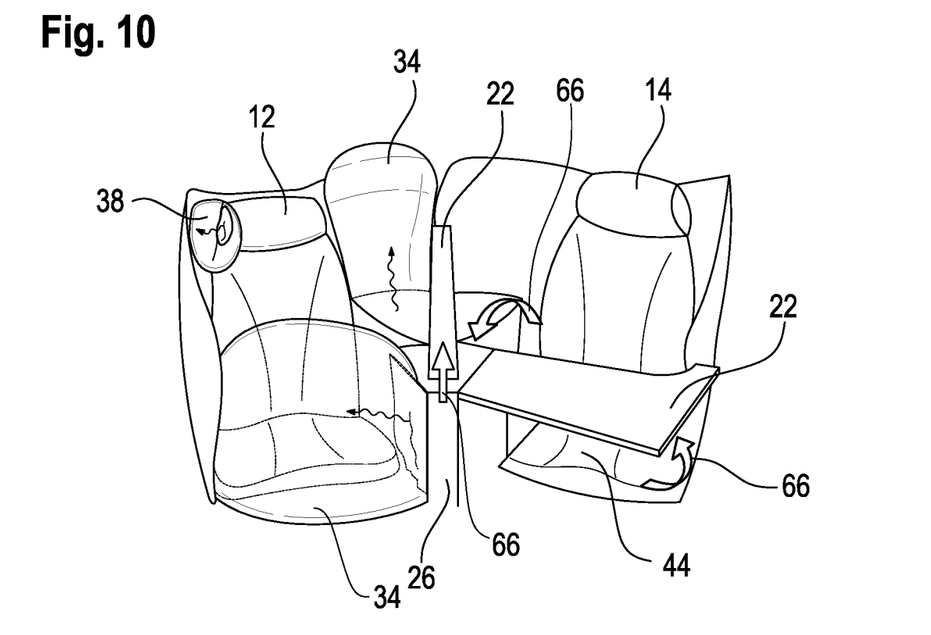
Figure 11:
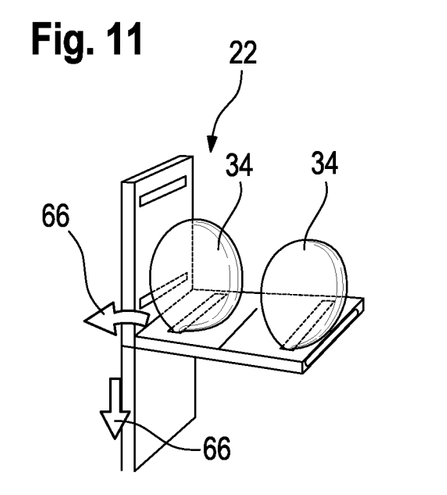
Figure 12:
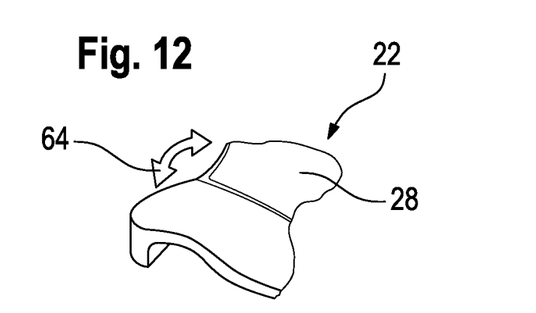

FIGS. 10 to 12 illustrate an embodiment in which a table 22 can be folded out of the center console 26 over the seat bottom 44 of the vehicle seat 12, 14, 16 or 18. FIG. 10 illustrates the front vehicle seats 12 and 14 as well as the folding of a table 22 toward the vehicle seat 14 (see arrows 66) and different airbags 34, 38 associated with the vehicle seat 12. As is shown in FIG. 11, for example two airbags 34 may be integrated in the table 22, the two airbags 34 being filled, in the case of a situation of restraint occurring while the table 24 is folded out, so as to restrain an occupant seated in the vehicle seat 12, 14, 16 or 18. Additionally, in FIG. 11 folding of the table 22 is sketched by the arrows 66. FIG. 12 illustrates the shape of the table board of the table 24 with the fold-out monitor 28 that offers sufficient legroom to the occupant 50.

Figure 13:
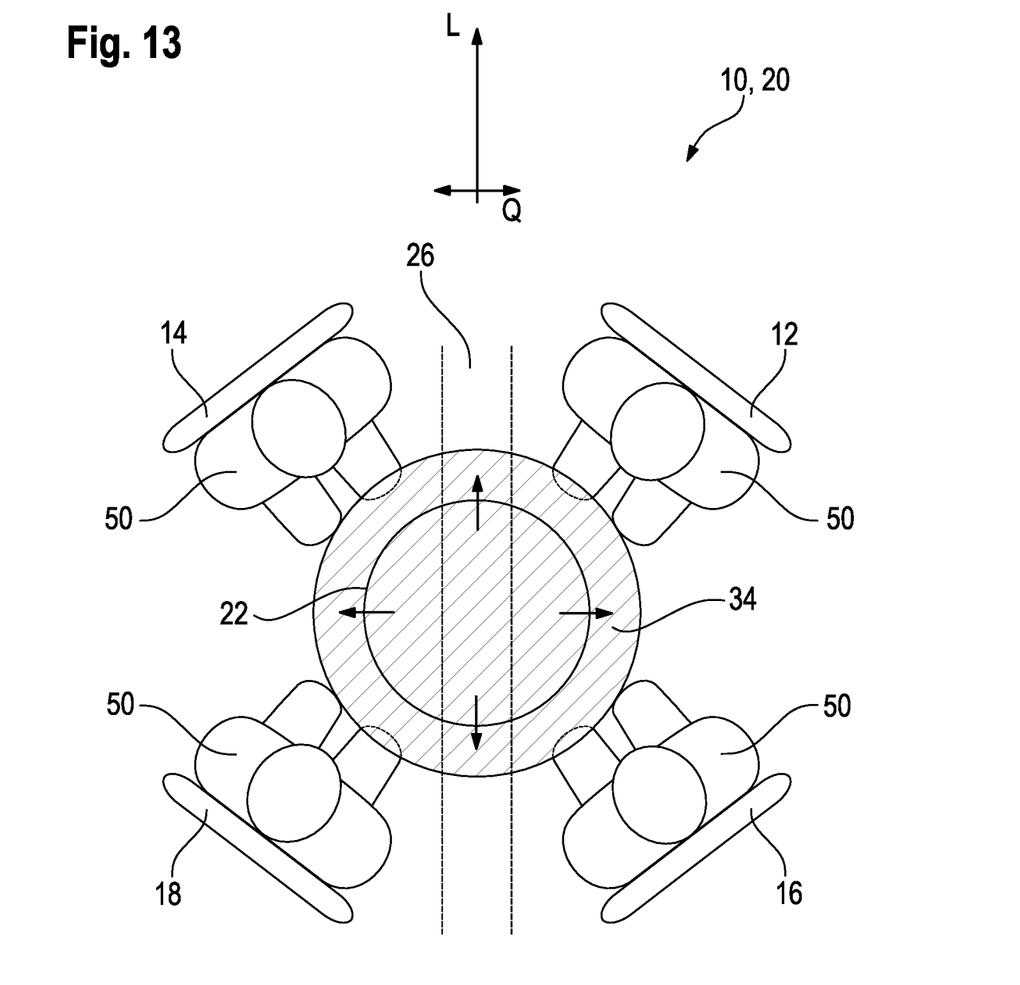
FIGS. 13 to 15 show further embodiments of vehicle seat groups according to the invention in a situation of restraint.
Figure 14:
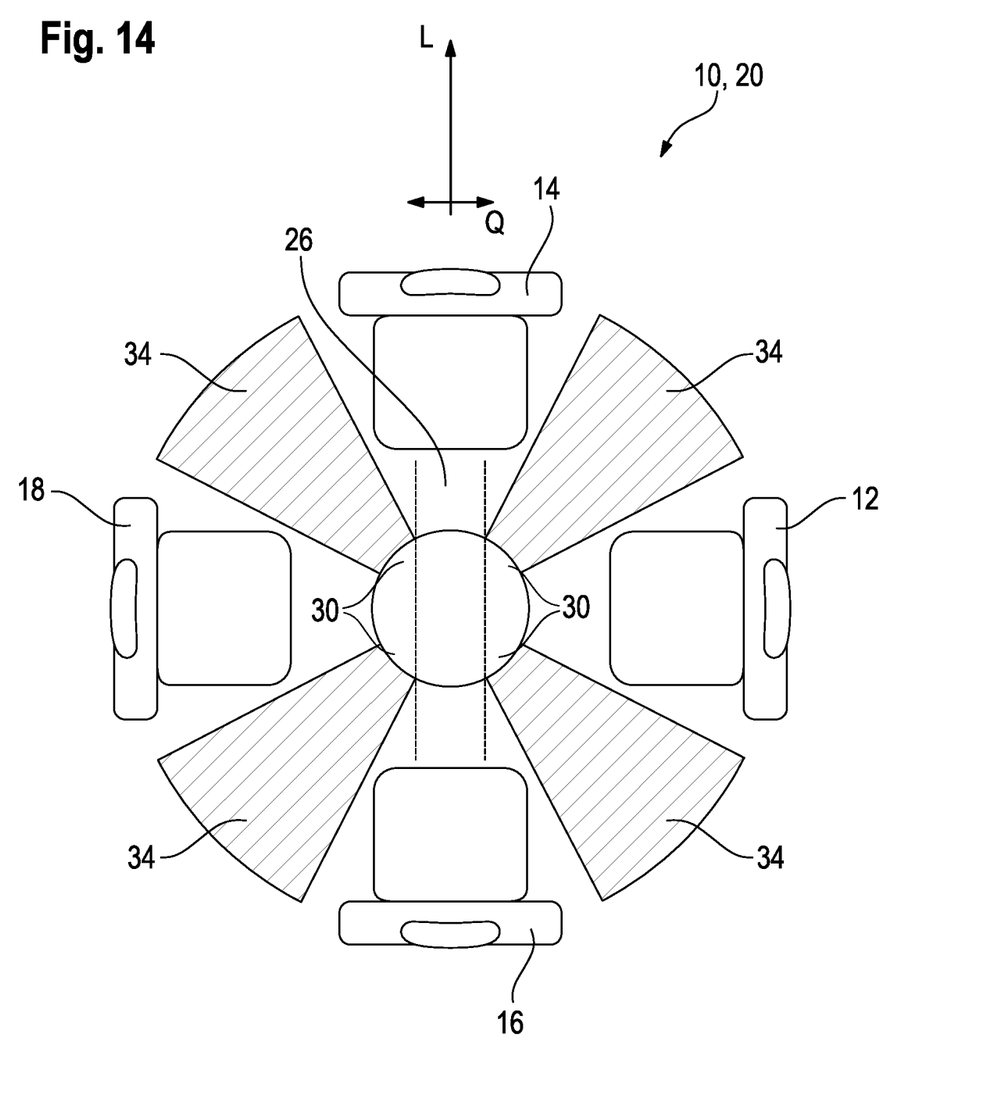
Figure 15:
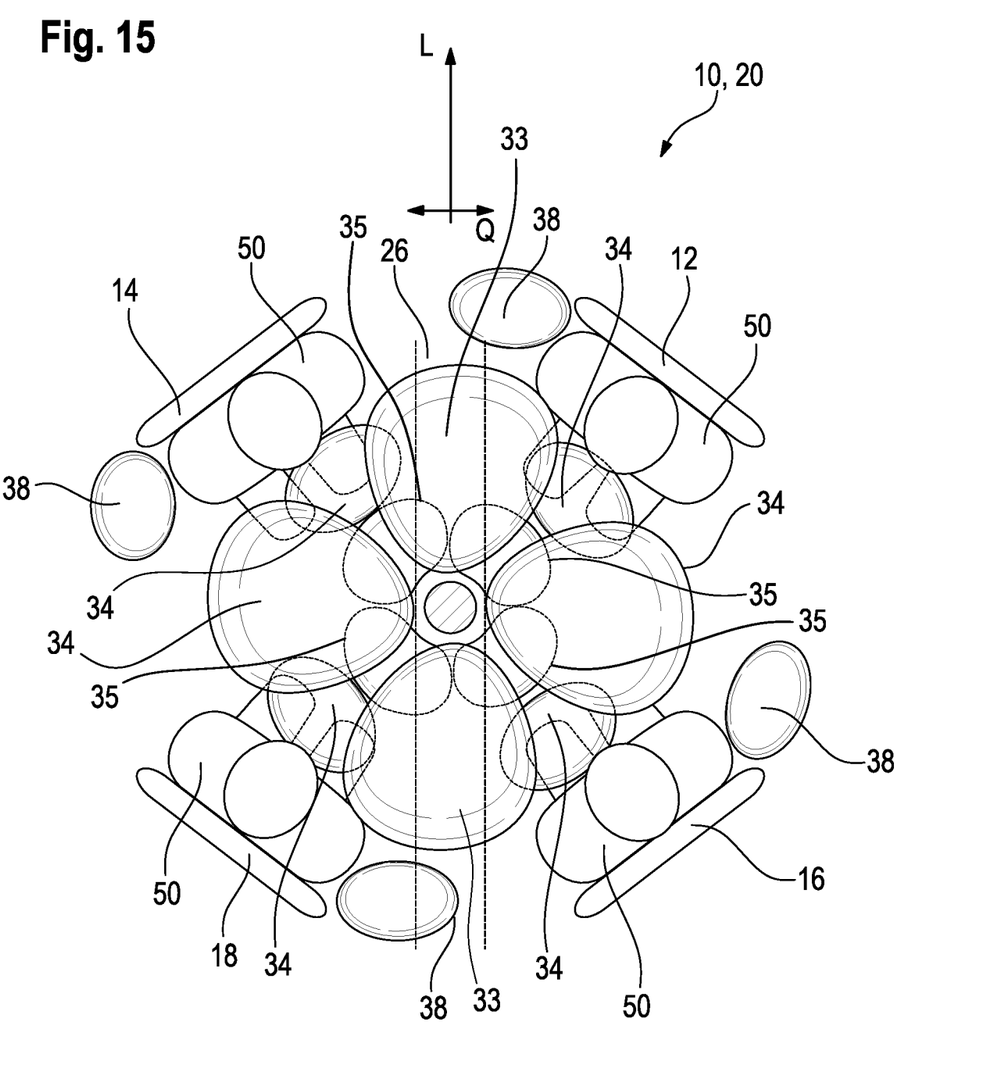

FIGS. 13 to 15 show further embodiments of a vehicle seat group 10 according to the invention.

In the vehicle seat groups 10 of FIGS. 13 to 15, the vehicle seats 12, 14, 16 and 18 are arranged so that respective two vehicle seats, in this case the vehicle seats 12 and 18 as well as 14 and 16, are aligned toward each other in their seat length direction S, wherein, in contrast to the vehicle seat groups 10 shown in FIGS. 3, 7 and 8, the seat length direction S of the front vehicle seats 12, 14 and, resp., of the rear vehicle seats 16, 18 are not aligned in parallel to each other in the same direction. As a matter of course, such positioning and alignment of the vehicle seats 12, 14, 16 and 18 may also be possible for a vehicle seat group as shown in FIGS. 3, 7 and 8.

FIG. 13 illustrates a vehicle seat group 10 comprising a table 22 disposed at the center console 26 which has a circular shape in this case. Within the table 22 an airbag module (not shown here) is arranged that comprises an airbag 34 extending, in the filled state, toward all vehicle occupants 50 and taking a substantially circular shape in the top view. In another embodiment that is not shown here, the airbag may also be ring-shaped.

FIG. 14 illustrates a vehicle seat group 10 comprising a center console 26 that does not extend over the entire length of the vehicle seat group 10 in the vehicle length direction L. This allows the vehicle seats 12, 14, 16 and 18 to be adjustable and movable not only along the vehicle length direction L but also along the vehicle transverse direction Q. As a matter of course, the vehicle seats 12, 14, 16 and 18 can also be rotatable about their vertical axis.

The vehicle seat group of FIG. 14 is shown to have deployed airbags 34 which extend between the respective vehicle seats. The airbag modules 30 are arranged in a central area of the center console 26. In FIG. 14, each of the vehicle seats 14 and 16 is displaced along the vehicle transverse direction Q and rotated about a vertical axis H in such a way that they are aligned toward each other in the vehicle transverse direction Q in the area of the center console, with the seat length directions S of the vehicle seats 14 and 16 being aligned substantially in parallel to the vehicle length direction L. Each of the two further vehicle seats 12 and 18 is displaced along a vehicle length direction L and rotated about the vertical axis H so that they are aligned toward each other in the vehicle length direction L in the area of a center of the center console, with the seat length directions S of the vehicle seats 12 and 18 being aligned substantially in parallel to the vehicle transverse direction Q.

For better clarity, the representation of possible further restraint elements was renounced in FIGS. 13 and 14. As a matter of course, also these vehicle seat groups 10 may comprise further restraint elements disposed in the center console, the table and/or in the vehicle seats, however.

FIG. 15 shows a vehicle seat group 10 in which, in the situation of restraint, plural airbag modules 30, 32 disposed in the center console 26, the table (not shown here) and the vehicle seats 12, 14, 16 and 18 were activated to fill different airbags 33, 35, 38 with gas and to restrain the vehicle occupants 50 as efficiently as possible.

The features described in the individual embodiments can be freely combined with each other or exchanged for each other at the skilled person's discretion.

The invention claimed is:

1. A vehicle seat group for a vehicle comprising at least two vehicle seats, a table, a center console and a vehicle occupant restraint system having at least one restraint element, wherein at least two vehicle seats of the vehicle seat group can be aligned toward each other in their seat length direction and can be rotatably adjustable about a seat rotation axis to different rotated positions, the table being interposed between the vehicle seats, wherein at least one restraint element of the vehicle occupant restraint system is arranged at and/or in at least one of the table and a center console of the vehicle;

wherein the at least one restraint element comprises at least one airbag module disposed in and/or at the table and comprising at least one airbag;

wherein each of the at least two seats comprises at least one airbag module comprising at least one airbag; and wherein the airbag module disposed in and/or at the table and the at least one airbag module of each of the at least two seats are configured to be activated so that different airbags are inflated from the table and vehicle seats depending on the rotated positions of the vehicle seats.

2. The vehicle seat group according to claim 1, wherein the at least one airbag module further comprises a front airbag module comprising a front airbag, wherein the front airbag module is configured to be activated so that the front airbag is inflated depending on the rotated positions of the vehicle seats.

3. The vehicle seat group according to claim 1, wherein the at least one airbag module comprises at least one of a side airbag module comprising a side airbag and a central airbag module comprising a central airbag, wherein the side airbag module is configured to be activated so that the side airbag is inflated depending on the rotated positions of the vehicle seats, and wherein the central airbag module is configured to be activated so that the central airbag is inflated depending on the rotated positions of the vehicle seats.

4. The vehicle seat group according to claim 1, wherein the restraint elements further comprise a seatbelt system.

5. The vehicle seat group according to claim 1, wherein the table is arranged at the center console to be pivotable and/or rotatable so that the table can be adapted to a positioning of the vehicle seats of the vehicle seat group.

6. The vehicle seat group according to claim 1, wherein the table can be accommodated and/or stowed in the center console.

7. The vehicle seat group according to claim 1, wherein the vehicle seat group comprises four vehicle seats.

8. The vehicle seat group according to claim 1, wherein the vehicle seats are adjustable, particularly movable, along a vehicle length direction and/or a vehicle transverse direction wherein the airbag module disposed in and/or at the table and the at least one airbag module of each of the at least two seats are configured to be activated so that different airbags are inflated from the table and vehicle seats depending further on the position of the at least two seats along the vehicle length and/or the vehicle transverse direction.

9. A vehicle, comprising at least one vehicle seat group according to claim 1 arranged in a vehicle interior.

10. The vehicle according to claim 9, wherein the center console is arranged with the table in an area between two front vehicle seats and two rear vehicle seats.

* * * * *